United States Patent Office 3,157,653
Patented Nov. 17, 1964

3,157,653
SULFATOALKYLAMINO DERIVATIVES OF TRIA-
ZINE AND PYRIMIDINE VAT DYESTUFF
Max Staeuble and Kurt Weber, Basel, and Paul Hugels-
hofer, Otelfingen, Switzerland, assignors to Ciba Lim-
ited, Basel, Switzerland, a company of Switzerland
No Drawing. Filed Nov. 17, 1961, Ser. No. 153,200
Claims priority, application Switzerland, Nov. 22, 1960,
13,071/60; Oct. 18, 1961, 12,052/61
5 Claims. (Cl. 260—249)

This invention provides new vat dyestuffs which contain at least one sulfatoalkylamino group bound to a nucleus containing two nitrogen atoms in a heterocyclic ring or bound to a chlorine-free triazine radical, and which contain at least 4, and advantageously at least 5, fused rings or at least two anthraquinone radicals. The term "vat dyestuffs" includes dyestuffs which can be converted by reduction into a so-called leuco compound or vat which has a better affinity for natural or regenerated cellulose fibers than the non-reduced form, and which can be reconverted by oxidation into the original chromophoric system. As suitable vat dyestuffs there may be mentioned more especially those of the anthraquinone series, for example, those which contain an anthraquinone nucleus and also fused rings, especially at least two fused carbocyclic or heterocyclic rings, or which consist of several anthraquinone units, and also vat dyestuffs of the perylene tetracarboxylic acid series. The vat dyestuffs may, of course, contain substituents usual in vat dyestuffs, for example, halogen atoms, alkoxy groups or acylamino groups, but they must contain at least one sulfatoalkylamino group bound to a nucleus containing two nitrogen atoms, in a heterocyclic ring or bound to a chlorine-free triazine ring. Especially valuable are those vat dyestuffs of the kind defined above which contain as the only groups imparting solubility in water one or more sulfatoalkylamino groups containing straight or branched lower alkylene chains.

The invention also provides a process for the manufacture of the aforesaid dyestuffs, wherein a vat dyestuff which contains at least four and advantageously at least five fused rings or at least two anthraquinone radicals and contains a hydroxyalkylamino group bound to a nucleus containing two nitrogen atoms in a heterocyclic ring or bound to a chlorine-free triazine ring, is treated with a sulfating agent.

The vat dyestuffs used as starting materials which contain a hydroxyalkylamino group as defined above can be prepared by condensing a polyhalogenated heterocyclic compound which contains two or three nitrogen atoms in a five- or six-membered ring, for example, cyameluric acid chloride, cyanuric chloride, cyanuric bromide, tri- or tetrachloropyrimidine, tetrachloropyridazine, dichloroquinoxaline or the like, on the one hand, with a vat dyestuff or a vat dyestuff intermediate containing an acylatable amino group and at least four, and advantageously at least five, fused rings or at least two anthraquinone radicals, and, on the other, with a primary or secondary hydroxylamine.

When cyanuric chloride or bromide is used the condensation is carried out in such manner that the resulting product containing a hydroxyalkylamino group contains no halogen in the triazine nucleus.

As vat dyestuffs or a vat dyestuff intermediate containing acylatable amino groups and at least four fused rings or at least two anthraquinone nuclei, there may be mentioned, for example, 4-aminoanthraquinone-2:1(N)-acridone, 5-amino-1:9-isothiazole-anthrone, 4- or 5-amino-anthrapyrimidine, amino-acedianthrones, 4- or 5-amino-1:1'-dianthrimide-carbazole, 4- or 5-amino-5'-benzoyl-amino-dianthrimide-carbazole, 4-amino-4'-benzoylamino-dianthrimide-carbazole, 4:4'-diamino-1:1'-dianthrimide-carbazole, 4:5'-diamino-1:1'-dianthrimide-carbazole, 5:5'-diamino-1:1'-dinanthrimide-carbazole, 4-aminoanthrapyridone, aminodibenzanthrone, aminoisodibenzanthrone, aminoanthanthrone, aminobenzanthrone, aminoflavanthrone, aminopyranthrone, aminodibenzpyrenequinone, and also compounds of the formulae

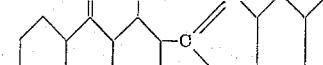

and

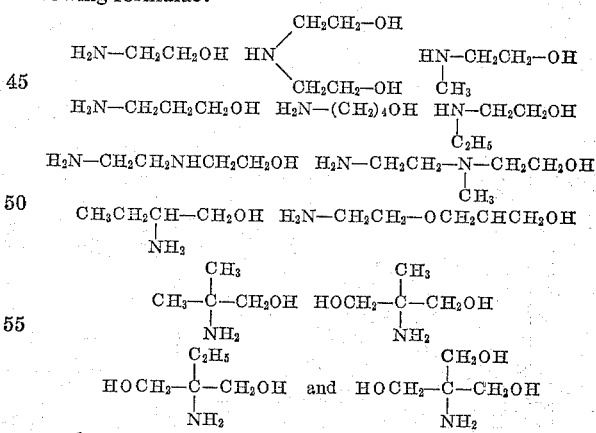

(in which $n=1$ or 2).

These vat dyestuffs containing amino groups are advantageously treated with acylating agents which contain the cyanuric ring externally bound, for example triazinyl-aminobenzoic acid halides.

As hydroxyalkylamines there are advantageously used those containing 2 to 8 carbon atoms, and they may contain a straight or branched alkyl radical. As examples there may be mentioned hydroxyalkylamines of the following formulae:

$$H_2N-CH_2CH_2OH \quad HN\begin{matrix}CH_2CH_2-OH\\CH_2CH_2-OH\end{matrix} \quad HN-CH_2CH_2-OH\\ \quad\quad\quad\quad\quad\quad\quad\quad\quad\quad\quad\quad\quad\quad\quad\quad\quad\quad | \\ \quad\quad\quad\quad\quad\quad\quad\quad\quad\quad\quad\quad\quad\quad\quad\quad\quad\quad CH_3$$

$$H_2N-CH_2CH_2CH_2OH \quad H_2N-(CH_2)_4OH \quad HN-CH_2CH_2OH\\ \quad\quad\quad\quad\quad\quad\quad\quad\quad\quad\quad\quad\quad\quad\quad\quad\quad\quad\quad\quad\quad\quad | \\ \quad\quad\quad\quad\quad\quad\quad\quad\quad\quad\quad\quad\quad\quad\quad\quad\quad\quad\quad\quad\quad\quad C_2H_5$$

$$H_2N-CH_2CH_2NHCH_2CH_2OH \quad H_2N-CH_2CH_2-N-CH_2CH_2OH\\ \quad\quad\quad\quad\quad\quad\quad\quad\quad\quad\quad\quad\quad\quad\quad\quad\quad\quad\quad\quad\quad\quad\quad | \\ \quad\quad\quad\quad\quad\quad\quad\quad\quad\quad\quad\quad\quad\quad\quad\quad\quad\quad\quad\quad\quad\quad\quad CH_3$$

$$CH_3CH_2CH-CH_2OH \quad H_2N-CH_2CH_2-OCH_2CHCH_2OH\\ \quad\quad | \\ \quad\quad NH_2$$

$$\quad\quad CH_3 \quad\quad\quad\quad\quad CH_3\\ \quad\quad | \quad\quad\quad\quad\quad\quad | \\ CH_3-C-CH_2OH \quad HOCH_2-C-CH_2OH\\ \quad\quad | \quad\quad\quad\quad\quad\quad | \\ \quad\quad NH_2 \quad\quad\quad\quad\quad NH_2$$

$$\quad\quad C_2H_5 \quad\quad\quad\quad\quad CH_2OH\\ \quad\quad | \quad\quad\quad\quad\quad\quad\quad | \\ HOCH_2-C-CH_2OH \quad\text{and}\quad HOCH_2-C-CH_2OH\\ \quad\quad | \quad\quad\quad\quad\quad\quad\quad\quad\quad\quad\quad | \\ \quad\quad NH_2 \quad\quad\quad\quad\quad\quad\quad\quad NH_2$$

The molar ratio of the reactants used in the condensation is advantageously such that for one or two acylatable amino groups of the parent vat dyestuff at least one molecular proportion of the polyhalogenated compound is present, and the further halogen atoms in the resulting condensation product are then exchanged by the reaction with the aforesaid hydroxyalkylamines. In the case of triazine condensation products all the halogen atoms must be exchanged for hydroxyalkylamino groups.

The sulfating of the hydroxyalkyl groups in the condensation products so obtained may be carried out by the usual methods, for example, by means of concentrated sulfuric acid, advantageously sulfuric acid of 100% strength or oleum of 1 to 10% strength at room temperature or with the application of heat. In certain cases the sulfation may be carried out by means of chlorosulfonic acid, advantageously in a tertiary amine, such as pyridine.

The dyestuffs of the invention are suitable for dyeing a very wide variety of materials, but especially for dyeing or printing textile materials of natural or regenerated cellulose by the dyeing or printing methods customarily used for vat dyestuffs. The dyeings and prints obtained with the dyestuffs of the invention are distinguished by their excellent fastness to light and excellent properties of wet fastness. In general their fastness to soda boiling is also excellent. The dyeings produced with the dyestuffs of the invention are also fast to dry cleaning and migration. The dyed fabrics can therefore be coated with synthetic resins, for example, with polyvinyl chloride, without the dyestuff migrating into the synthetic resin, which is especially important in the production of artificial leather.

The dyestuffs of the invention are generally very easy to vat, in many cases at room temperature, and, if desired, with mild reducing agents, and they possess a very good levelling and through-dyeing power. Owing to the ease with which these dyestuffs can be vatted, it is unnecessary to work them up into finely dispersed powders or pastes.

The following examples illustrate the invention, the parts and percentages being by weight:

*Example 1*

20 parts of aminodibenzanthrone (nitrogen content=3.67%) are suspended in 300 parts of dry nitrobenzene, while stirring, and the whole is heated to 160 to 170° C. There is then added a solution of 13 parts of cyanuric chloride in 80 parts of nitrobenzene, 0.5 part of anhydrous pyridine is added, and the whole is stirred for a further 12 hours at 170° C. After cooling the mixture to 30° C., the product of the cyanuration is isolated by filtration and washed with nitrobenzene. The filter residue is then introduced in small portions at 150 to 160° C. into 100 parts of monoethanolamine, and the whole is stirred for 4 hours at 150° C. After cooling the mixture it is poured into water, and the reaction product is isolated by filtration, thoroughly washed with water and acetone, and dried in vacuo at 70 to 80° C.

The dried condensation product is then introduced in small portions into 300 parts of sulfuric acid of 100% strength and the whole is stirred for 4 hours at room temperature. The mixture is then poured into ice water, the dyestuff is filtered off and washed with water until the washings are neutral, and the dyestuff is dried in vacuo at 80° C. The new dyestuff of the formula

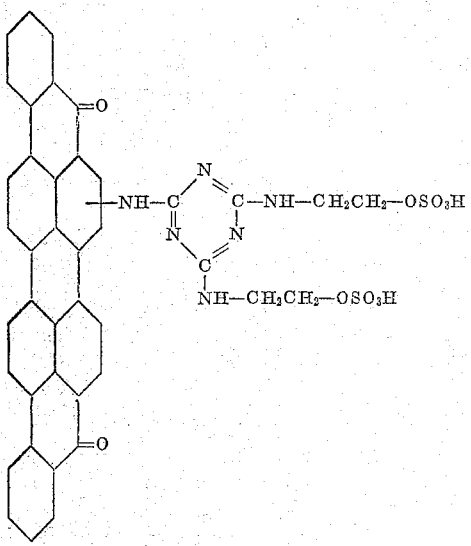

can be vatted very easily, and dyes cotton and regenerated cellulose from an alkaline hydrosulfite vat blue-green to blue-black tints having very good properties of wet fastness and an excellent fastness to light.

A dyestuff having similar properties is obtained by using for the esterification, instead of the aforesaid quantity of sulfuric acid of 100% strength, an equal quantity of chlorosulfonic acid at 0 to 4° C. or the same quantity of ortho-dichlorobenzene containing 27 parts of pyridine and 48 parts of chlorosulfonic acid, and the mixture is heated for several hours at 60° C.

*Example 2*

25 parts of the condensation product of 20 parts of aminodibenzanthrone (nitrogen content=3.48%) and 13 parts cyanuric chloride are introduced in small portions at 160 to 170° C., into 200 parts of diethanolamine, and the whole is stirred for 3 hours at that temperature. After cooling the mixture, it is poured on to ice and the reaction product is isolated by filtration, thoroughly washed with water and acetone, and dried in vacuo at 90° C.

The dry condensation product is then slowly introduced into 300 parts of sulfuric acid monohydrate and the whole is stirred for 3 hours at room temperature. The whole is then introduced into ice water, the dyestuff is isolated by filtration, and it is then washed until the washings are neutral and dried in vacuo at 80° C.

The dyestuff has the probable formula

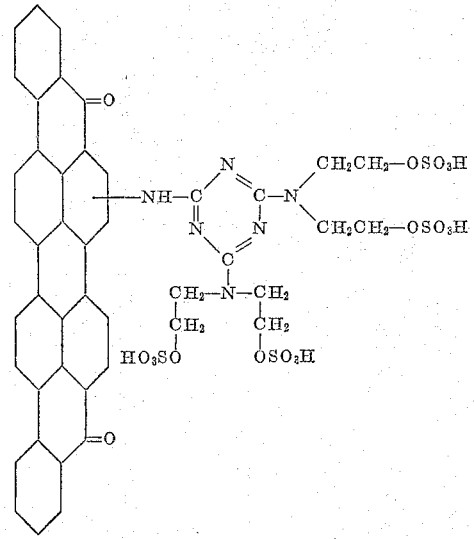

It can be vatted very easily and dyes cotton and regenerated cellulose from a violet hydrosulfite vat blue-grey to blue-black tints having very good properties of wet fastness.

*Example 3*

9 parts of aminodibenzanthrone (nitrogen content=3.21%) are suspended in 200 parts of dry nitrobenzene, while stirring, and the whole is heated to 160 to 170° C. There is then added a solution of 6 parts of 2:4:5:6-tetrachloropyrimidine in 50 parts of nitrobenzene, 0.5 part of pyridine are also added, and the whole is stirred for 20 hours at 130° C. After cooling the mixture to room temperature, the condensation product is isolated by filtration with suction and washed with nitrobenzene and then with acetone. The filter residue is introduced in small portions, while stirring, at 150 to 150° C. into 100 parts of monoethanolamine, and boiled for 2 hours under reflux. After being cooled, the mixture is introduced into water, and the reaction product is isolated by filtration, washed with water and then with acetone, and dried in vacuo at 70° C.

The dry product is then introduced in small portions into 170 parts of sulfuric acid monohydrate, and the esterification is carried on for 2 hours at room temperature. The mixture is then introduced into ice water, the dyestuff is isolated by filtration, and it is then washed with water until the washings are natural and dried in vacuo at 80° C.

The new dyestuff of the formula

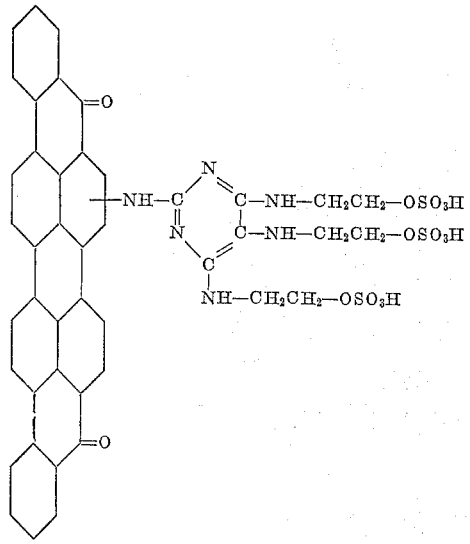

can be very easily vatted, and dyes cotton and regenerated cellulose from an alkaline hydrosulfite vat grey tints having very good properties of fastness.

Dyestuffs having similar properties are obtained by using in this example, instead of 2:4:5:6-tetrachloropyrimidine, the equivalent quantity of 2:4:6-trichloropyrimidine of the corresponding quantity of 2:4:6-tribromopyrimidine.

*Example 4*

5 parts of amino-acedianthrone, 5 parts of cyanuric chloride and 100 parts of dry nitrobenzene are stirred for 8 hours at 170 to 180° C. After being cooled to room temperature, the product is isolated by filtration, washed with nitrobenzene and acetone, and then introduced in small portions into 50 parts of 4-aminobutanol. The suspension is heated for several hours at 110 to 120° C., then cooled, and the reaction product is isolated by filtration. The filter residue is washed with acetone and esterified by being reprecipitated from 20 times its weight of sulfuric acid of 100% strength at room temperature.

The mixture is then poured into ice water and the dyestuff of the formula

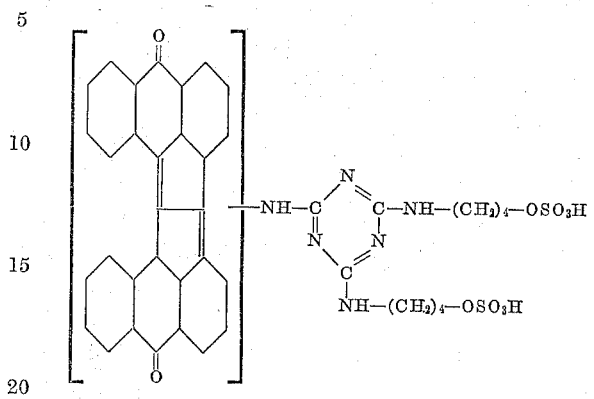

is isolated by filtration. The filter residue is pasted with water and adjusted to the pH value of 8.5 by means of a solution of sodium hydroxide, and the mixture is then evaporated to dryness in vacuo at 60 to 70° C.

The dyestuff dyes cotton and regenerated cellulose from a hydrosulfite vat very fast brown tints.

By using in this example, instead of 4-aminobutanol, the same quantity of N-methyl-ethanolamine or 3-aminopropanol, there are obtained dyestuffs having similar tinctorial properties.

*Example 5*

7.6 parts of 2-(3'-carboxyphenylamino)-4:5:6-trichloropyrimidine are converted into the corresponding carboxylic acid chloride by being stirred in 100 parts of dry nitrobenzene with 4 parts of thionyl chloride for 2 hours at 95 to 97° C., while stirring well. After the addition of 8.4 parts of amino-acedianthrone and 0.1 part of pyridine, the condensation is carried out for 3 hours at 140 to 150° C., while stirring well. The brown suspension is cooled, filtered, and the filter residue is washed with nitrobenzene and then with alcohol and then introduced in small portions into 150 parts of dioxane and 50 parts of N-methylethanolamine. The whole is heated for 3 hours at 100 to 105° C., it is then allowed to cool, and the reaction product is isolated by filtration. The filter residue is washed with dioxane, then with acetone and is esterified by reprecipitation from 15 times its weight of sulfuric acid of 100% strength at 6 to 8° C. The sulfuric acid mixture is poured on to ice water, and the dyestuff is isolated by filtration. The filter residue is pasted with a small amount of water, then adjusted to a pH value of 8 with sodium hydroxide solution, and dried in vacuo at 60° C. The dyestuff of the formula

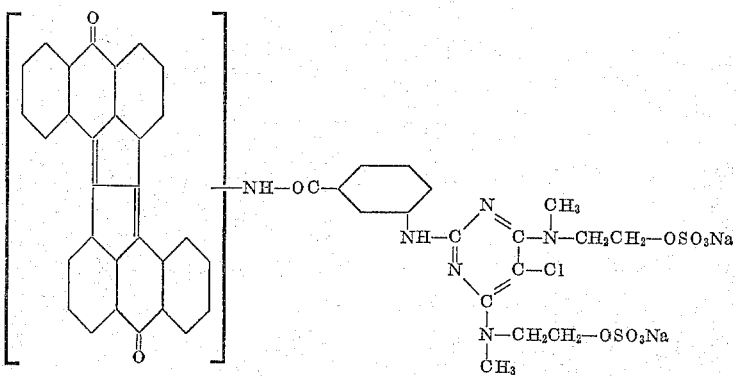

dyes cotton and regenerated cellulose fast brown tints from an alkaline hydrosulfite vat.

The 2-(3'-carboxy - phenylamino) - 4:5:6 - trichloropyrimidine used in this example can be prepared, for example, by heating for 4 hours at 70 to 75° C. an aqueous alcoholic solution of 50% strength of an equimolecular mixture of the sodium salt of 3-aminobenzoic acid and 2:4:5:6-tetrachloropyrimidine, and the product is obtained in the form of colorless needles melting at 203 to 205° C.

By using in this example, instead of 2-(3'-carboxyphenylamino)-4:5:6-trichloropyrimidine, an equivalent quantity of 2-(4'-carboxy - phenylamino) - 4:6 - dichloro-1:3:5-triazine or 2-(4'-carboxyphenylamino)-4-amino-6-chloro-1:3:5-triazine, there are obtained dyestuffs having similar properties.

Example 6

6.2 parts of 2-(4'-carboxyphenylamino)-4:6-dichloropyrimidine are converted into the carboxylic acid chloride in 100 parts of dry nitrobenzene with 4 parts of thionyl chloride, while stirring and heating at 90 to 100° C. After the addition of 0.1 part of pyridine, 6.8 parts of 4-aminoanthraquinone-2:1(N)-acridone are introduced, and condensation is brought about for 2 hours at 120 to 125° C. and then for a further hour at 145 to 150° C. After the mixture has been cooled, the acylation product is isolated by filtration, washed with alcohol and then stirred in small portions into 100 parts of monoethanolamine. The whole is heated for 3 hours at 110° C., and is then cooled and introduced into ice water. The reaction product is filtered off, washed with water and then with acetone, and dried. For esterification the dry powder is introduced into 100 parts of sulfuric acid of 100% strength, the mixture if stirred for 2 hours at 4 to 8° C., and then poured on to ice water, and the dyestuff is isolated by filtration. The filter residue is pasted with a small amount of water, adjusted to a pH-value of 8 with sodium hydroxide solution and then evaporated to dryness in vacuo at 60° C.

The dyestuff so obtained has the formula

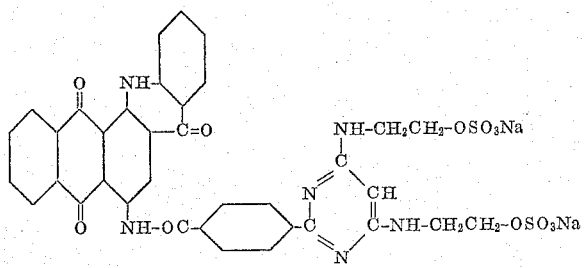

and dyes cotton and regenerated cellulose from an alkaline hydrosulfite vat greenish blue tints having good properties of fastness.

The 2-(4'-carboxyphenylamino)-4:6-dichloropyrimidine used in this example can be obtained by heating for several hours at 70 to 75° C. an aqueous alcoholic solution of 50% strength of equimolecular proportions of the sodium salt of 4-aminobenzoic acid and 2:4:6-trichloropyrimidine, the product being obtained in a crystalline form.

By using in this example, instead of 2 - (4' - carboxyphenylamino) - 4:6 - dichloropyrimidine, the equivalent quantity of 2-(4'-carboxyphenylamino)-4-methyl-6-chloropyrimidine, which can be obtained by heating an aqueous alcoholic solution of 50% strength of 4-amino-benzoic acid and 2:6-dichloro-4-methylpyrimidine, there is obtained a dyestuff having similar properties.

Example 7

6.85 parts of 2-(3'-carboxyphenylamino)-4:6-dichloro-1:3:5-triazine and 5 parts of thionyl chloride in 150 parts of dry nitrobenzene and 0.2 part of pyridine are stirred and heated at 90 to 95° C. in the course of 2 to 3 hours, whereby the corresponding carboxylic acid chloride is obtained. The excess of thionyl chloride is distilled off in vacuo, then 4.6 parts of 5:5'-diamino-1:1'-dianthrimide-carbazole are added, and condensation is carried out for 4 hours at 140 to 145° C. and then for a further 6 hours at 170 to 180° C. After cooling the mixture the acylation product is isolated by filtration, washed with nitrobenzene and then acetone, and then introduced in small portions into 150 parts of 2-aminoethanol. The brown suspension is stirred for 4 hours at 105° C. After being cooled, the mixture is introduced into ice water, and the reaction product is isolated by filtration, washed until the washings are neutral, and dried. For esterification the dry powder is introduced into 100 parts of sulfuric acid of 100% strength, and the mixture is stirred for 4 hours at 5 to 9° C., and is then worked up in the usual manner.

The resulting dyestuff of the formula

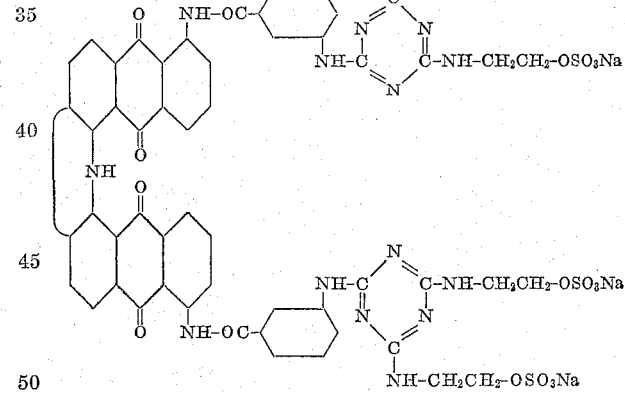

can easily be vatted, and dyes cotton and regenerated cellulose very fast yellow-brown tints.

Example 8

6.9 parts of 4:5'-diamino-1:1'-dianthrimide - carbazole are heated in 250 parts of nitrobenzene with 12.5 parts of cyanuric chloride and 1.0 part of pyridine for 16 hours at 160 to 170° C., while stirring. After being cooled, the red-brown suspension is filtered, and the filter residue is washed with nitrobenzene. The filter residue, while moist with nitrobenzene, is then suspended in 200 parts of dioxane, and the mixture is heated with 25 parts of 2-amino-2-methyl-1:3-propane-diol to 100° C., while stirring. The mixture is then maintained for 6 hours under reflux, and the reaction product is then isolated by filtration. The filter residue is washed with dioxane and dried in vacuo at 80° C.

For esterification the pulverized product is introduced in small portions into 150 parts of oleum containing 5% of sulfur trioxide, and the mixture is stirred for 3 hours, and then poured cautiously on to ice water. The new dyestuff so obtained has the formula

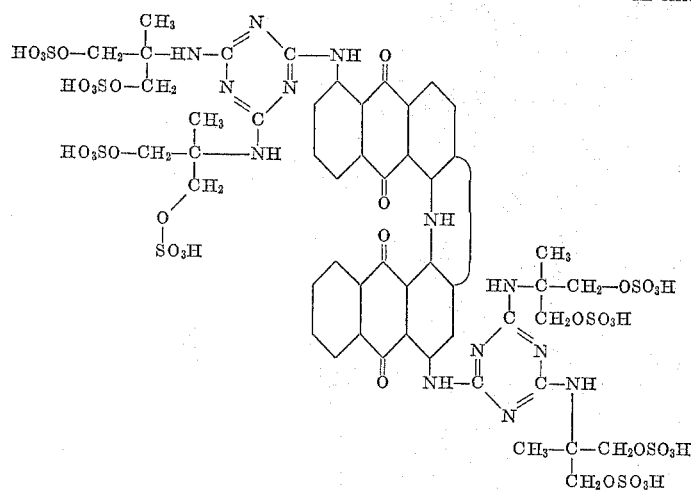

and is isolated by filtration, and converted into its sodium salt by neutralizing the filter residue with dilute sodium hydroxide solution.

The dyestuff is easily soluble in the vat, and dyes cotton and regenerated cellulose very fast brown tints.

By using in this example, instead of 2-amino-2-methyl-1:3-propanediol, the same quantity of 2-amino-butanol or 2-amino-2-methyl-1-propanol or tris-(hydroxymethyl)-aminomethane, dyestuffs having similar properties are obtained.

*Example 9*

6.1 parts of the dyestuff intermediate product of the formula

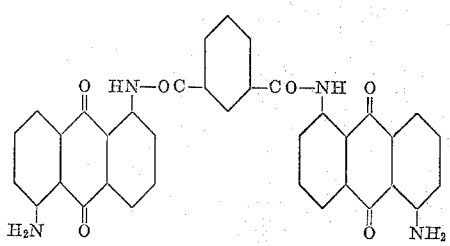

which can be obtained by condensing 1 mol of isophthalic acid dichloride with 2 mols of 1-amino-5-nitro-anthraquinone followed by reduction, are dissolved at the boil in 200 parts of dry nitrobenzene. The brown-red solution is allowed to cool to 170° C., and a solution of 6.0 parts of cyanuric chloride in 50 parts of nitrobenzene is then added. After the addition of 0.2 part of dry pyridine, condensation is carried out for 9 hours at 170 to 180° C., then the mixture is allowed to cool, and the product is isolated by filtration. It is washed with acetone and dried at 40° C. in vacuo.

9.0 parts of the product so obtained are then introduced at room temperature into 150 parts of monoethanolamine, and the whole is heated for 3 hours at 100 to 105° C., while stirring. After cooling the reaction mixture it is poured on to ice, the reaction product is isolated by filtration, washed with water until the washings are neutral, and dried in vacuo at 70° C.

The dried product is then pulverized, and introduced in small portions into 150 parts of oleum containing 2% of sulfur trioxide, while stirring, at 4 to 8° C. The mixture is further stirred at that temperature for 3 hours, and is then poured on to ice. The dyestuff is isolated from the suspension by filtration, and is cautiously washed with water until dissolution begins. The filter residue is then pasted with a small amount of water, adjusted to a pH value of 8 with a dilute solution of sodium hydroxide, and the dyestuff is salted out by the addition of sodium chloride. The dyestuff is filtered off, pressed well, and dried in vacuo at 70° C.

The dyestuff of the formula

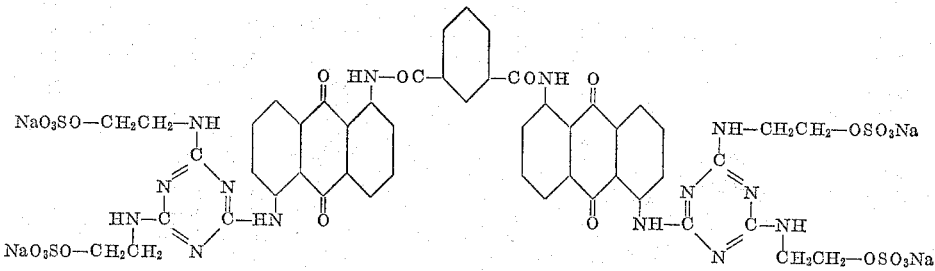

is soluble in water and dyes cotton and regenerated cellulose from an alkaline hydrosulfite vat fast brown-yellow tints.

*Example 10*

6.8 parts of 2-(4'-carboxyphenylamino)-4-amino-6-chloro-1:3:5-triazine are suspended in 200 parts of dry nitrobenzene and 1.0 part of dimethylformamide, and 6.0 parts of thionyl chloride are added, while stirring. The whole is then heated at 90 to 100° C. until a clear solution of the acid chloride is obtained. There are then introduced 6.1 parts of the dyestuff intermediate of the formula

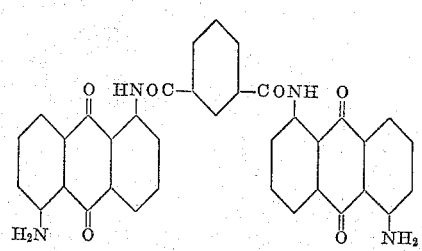

and the latter is acylated for 3 hours at 130 to 140° C. and then for 2 hours at 160° C. After cooling the mixture, the acylation product is isolated by filtration, washed with acetone, and introduced into 100 parts of N-methyl-ethanolamine. The whole is heated for 4 hours at 100 to 110° C., while stirring, then cooled, poured into ice water, and the reaction product is isolated by filtration, washed with water and died in vacuo at 70° C.

For esterification the dyestuff is introduced in small portions into 150 parts of sulfuric acid of 100% strength at 4 to 8° C., the whole is stirred for 3 hours, and is then poured on to ice. The dyestuff has the formula to remove adherent sulfuric acid. The filter residue is pasted with a small amount of water, and adjusted to a pH value of 8 with a dilute solution of sodium hydroxide and dried in vacuo at 70° C.

The resulting dyestuff of the formula

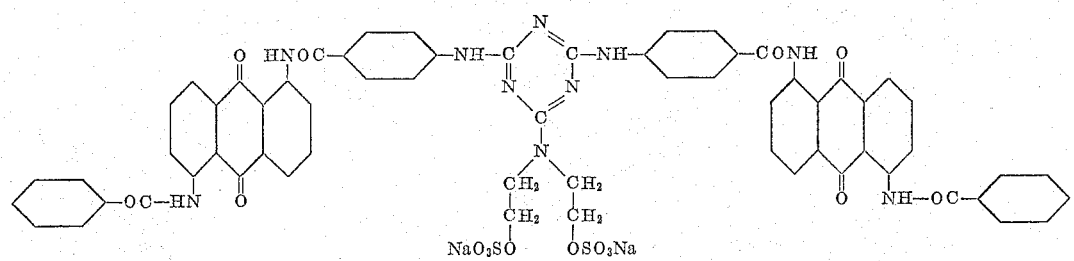

dyes cotton and regenerated cellulose from an alkaline

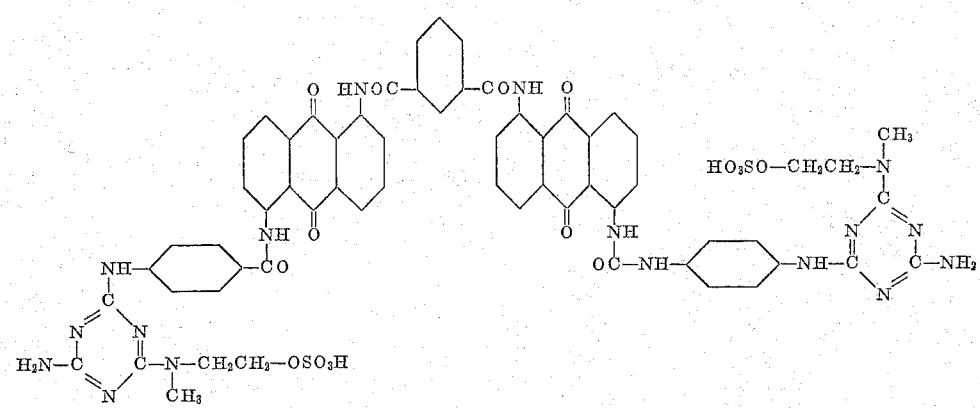

and is filtered off, and converted into its sodium salt by cautiously neutralizing the filter residue with sodium hydroxide solution. The product is dried in vacuo at 60 to 70° C.

The dyestuff dyes cotton and regenerated cellulose reddish yellow tints having very good properties of fastness.

*Example 11*

3.9 parts of 2:4-bis-(4'-carboxyphenylamino)-6-chloro-1:3:5-triazine are suspended in 120 parts of dry nitrobenzene, and converted into the corresponding dicarboxylic acid chloride with 4 parts of thionyl chloride at 100 to 105° C., while stirring. The excess of thionyl chloride is then removed in vacuo, and then 6.9 parts of 1-amino-5-benzoylaminoanthraquinone are introduced. The temperature is raised to 160 to 170° C., and the whole is stirred at that temperature for a further 3 hours. After cooling the mixture, the condensation product is filtered off, washed with nitrobenzene and then with alcohol, and suspended in 100 parts of diethanolamine. The suspension is heated at 110° C., for 3 hours while stirring, and, after being cooled, the mixture is poured on to ice water. The reaction product is filtered off, washed with water, and dried.

The dried pulverized product is then introduced in small portions into 150 parts of sulfuric acid of 100% strength at 4–8° C. while stirring, and the whole is stirred for 4 hours at that temperature. The mixture is then poured on to ice. The suspension of the yellow-brown dyestuff is then filtered, and the filter residue is washed with water hydrosulfite vat orange-yellow tints having very good properties of fastness.

What is claimed is:

1. A vat dye of the formula D—NH—X wherein D is dibenzanthrone and X is a member selected from the group consisting of the pyrimidine and the 1:3:5-triazine radical bound through one of its carbon atoms to the —NH-bridge and bearing at two of its further carbon atoms a lower sulfatoalkyl-amino group bound by its amino nitrogen atom, the fourth carbon atom of the pyrimidine nucleus bearing a member selected from the group consisting of the chlorine and the lower sulfatoalkylamino substituents.

2. The dyestuffs of claim 1, wherein the lower sulfatoalkylamino group is β-sulfatoethylamino.

3. The vat dyestuff of the formula

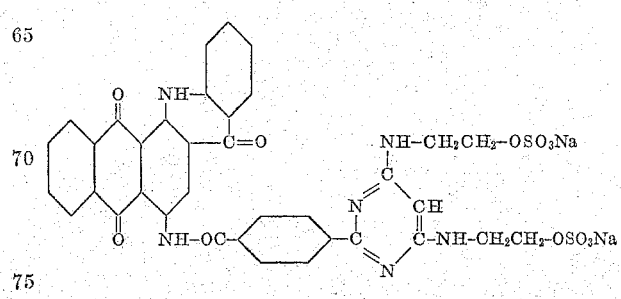

4. The vat dyestuff of the formula

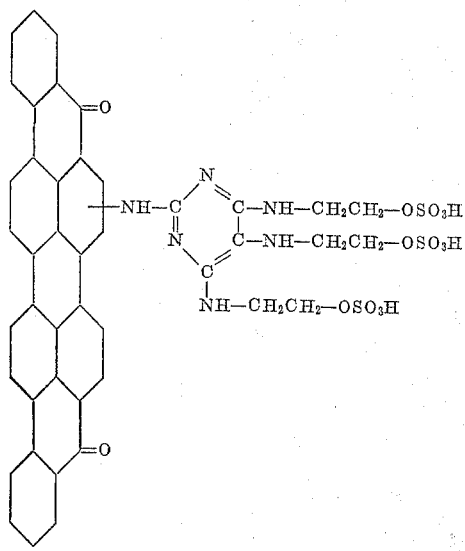

5. The vat dyestuff of the formula

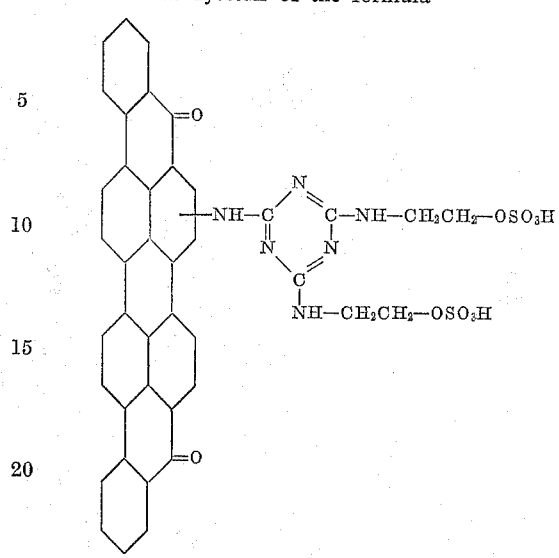

References Cited in the file of this patent

UNITED STATES PATENTS

| | | |
|---|---|---|
| 2,042,683 | Scheyer et al. | June 2, 1936 |
| 2,298,533 | Hentrich et al. | Oct. 13, 1942 |
| 2,368,451 | D'Alelio | June 30, 1945 |
| 2,567,822 | Moergeli | Sept. 11, 1951 |
| 2,742,466 | Randall et al. | Apr. 17, 1956 |
| 2,773,871 | Brassell et al. | Dec. 11, 1956 |
| 2,840,560 | Sutter | June 24, 1958 |
| 2,907,762 | Heslop | Oct. 6, 1959 |
| 2,935,506 | Heslop et al. | May 3, 1960 |
| 3,022,304 | Staeuble et al. | Feb. 20, 1962 |
| 3,029,123 | Putter et al. | Apr. 10, 1962 |
| 3,043,650 | Wegmann et al. | July 10, 1962 |
| 3,054,795 | Staeuble et al. | Sept. 18, 1962 |

FOREIGN PATENTS

| | | |
|---|---|---|
| 1,247,536 | France | Oct. 24, 1960 |

OTHER REFERENCES

Wegmann: "Textil-Praxis," October 1958, page 1056.